US011286999B2

(12) United States Patent
Chae et al.

(10) Patent No.: US 11,286,999 B2
(45) Date of Patent: Mar. 29, 2022

(54) FRICTION ELEMENT LATCH DEVICE

(71) Applicants: Hyundai Motor Company, Seoul (KR); Kia Motors Corporation, Seoul (KR)

(72) Inventors: Minho Chae, Incheon (KR); Chonok Kim, Yongin-si (KR); Sun Sung Kwon, Anyang-si (KR); Yong Uk Shin, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 372 days.

(21) Appl. No.: 16/547,043

(22) Filed: Aug. 21, 2019

(65) Prior Publication Data

US 2020/0277999 A1   Sep. 3, 2020

(30) Foreign Application Priority Data

Feb. 28, 2019   (KR) .................. 10-2019-0023890

(51) Int. Cl.
| | | |
|---|---|---|
| *F16D 55/08* | (2006.01) | |
| *F16D 55/02* | (2006.01) | |
| *F16H 25/20* | (2006.01) | |
| *F16H 25/22* | (2006.01) | |
| *F16D 65/18* | (2006.01) | |
| *F16D 13/40* | (2006.01) | |
| *F16D 125/40* | (2012.01) | |
| *F16D 121/14* | (2012.01) | |

(52) U.S. Cl.
CPC ............ *F16D 55/02* (2013.01); *F16D 13/40* (2013.01); *F16D 65/18* (2013.01); *F16H 25/20* (2013.01); *F16H 25/2204* (2013.01); *F16D 2121/14* (2013.01); *F16D 2125/40* (2013.01); *F16H 2025/2081* (2013.01)

(58) Field of Classification Search
CPC .......... F16H 2025/204; F16H 25/2015; F16H 25/20; F16D 28/00; F16D 2127/06; F16D 2125/40; F16D 55/02; F16D 65/18; F16D 2121/14; F16D 2121/2121; F16D 2121/24
See application file for complete search history.

(56) References Cited

U.S. PATENT DOCUMENTS

| | | | |
|---|---|---|---|
| 8,074,778 B2 | 12/2011 | Jayaram et al. | |
| 9,453,574 B2 | 9/2016 | Nakano et al. | |
| 10,641,370 B2 * | 5/2020 | Kreutzer | F16H 25/2223 |
| 2007/0029142 A1 * | 2/2007 | Drennen | F16D 65/18 |
| | | | 188/72.7 |

(Continued)

FOREIGN PATENT DOCUMENTS

| | | |
|---|---|---|
| JP | 2015-135159 A | 7/2015 |
| KR | 10-1231413 B1 | 2/2013 |
| KR | 10-1635716 B1 | 7/2016 |

*Primary Examiner* — Nicholas J Lane
(74) *Attorney, Agent, or Firm* — Morgan, Lewis & Bockius LLP

(57) ABSTRACT

A friction element latch device includes: a screw provided to be rotatable by receiving power from a driving source; a piston arranged to be movable by rotation of the screw; a guide arranged to selectively restrict movement of the piston; a guide pin protruding in a radial direction from an outer circumferential surface of the piston and guided by the guide; and a friction element arranged to be engaged as the piston moves.

13 Claims, 7 Drawing Sheets

(56) References Cited

U.S. PATENT DOCUMENTS

2010/0179026 A1    7/2010   Grochowski et al.
2013/0025982 A1*   1/2013   Suzuki ................ F16D 65/0979
                                                          188/72.4
2014/0166429 A1    6/2014   Kim et al.

* cited by examiner

FRICTION ELEMENT LATCH DEVICE

CROSS-REFERENCE TO RELATED APPLICATION(S)

This application is based on and claims priority under 35 U.S.C. § 119 to Korean Patent Application No. 10-2019-0023890, filed on Feb. 28, 2019, in the Korean Intellectual Property Office, the disclosure of which is incorporated by reference herein in its entirety.

TECHNICAL FIELD

The present disclosure relates to a friction element latch device, and more particularly, to a friction element latch device having an improved structure.

BACKGROUND

An automatic transmission for a vehicle is configured to automatically perform the shifting by detecting a running state of the vehicle from a detection means disposed at a proper position of the vehicle and automatically controlling the operation of a gear train composed of the combination of planetary gear sets through a transmission control unit (TCU) based on the detected running state.

In order to combine the planetary gear sets, a friction element such as a brake and a clutch, whose operation is selectively controlled at each shifting level, are applied.

While the brake and the clutch are, as the same configuration, provided with a plurality of discs and plates arranged alternately and a piston that presses the discs and plates for friction, the brake is disposed between a rotating body and a non-rotating body and the clutch is disposed between a rotating body and a rotating body.

Conventionally, it is necessary to continuously consume energy in order to maintain the engagement state of the friction element. In addition, a separate power source is required to release the engagement state.

SUMMARY

It is an aspect of the present disclosure to provide a friction element latch device capable of reducing energy consumption.

It is another aspect of the present disclosure to provide a friction element latch device capable of controlling the engagement and disengagement of friction element with a relatively simple configuration.

Additional aspects of the disclosure will be set forth in part in the description which follows and, in part, will be obvious from the description, or may be learned by practice of the disclosure.

In accordance with an aspect of the present disclosure, a friction element latch device includes: a screw arranged to be rotatable by receiving power from a driving source; a piston arranged to be movable by rotation of the screw; a guide arranged to selectively restrict movement of the piston; a guide pin protruding in a radial direction from an outer circumferential surface of the piston to be movable together with the piston and guided by the guide; and a friction element arranged to be engaged as the piston moves.

The guide may include a guide groove into which the guide pin is slidably inserted, and the guide groove may include a latch groove provided to restrict the movement of the guide pin in order to maintain a state in which the friction element is engaged.

The guide may further include a restriction device protruding inside the guide groove to restrict the movement of the guide pin in order to maintain the state in which the friction element is engaged.

The restriction device may include a restricting member and a restricting elastic member provided to elastically bias the restricting member toward the inside of the guide groove.

The guide groove may include a guide surface for guiding the movement of the guide pin to move the piston in a direction in which the friction element is disengaged.

The guide may further include a guide device for guiding the movement of the guide pin to move the piston in a direction in which the friction element is disengaged.

The guide device may include a support member and a guide elastic member provided to elastically bias the support member toward the inside of the guide groove.

A plurality of the guide pins may be provided along a circumferential direction of the piston, and a plurality of the guide may be provided to correspond to the plurality of guide pins.

The friction element latch device may further include a housing for accommodating the driving source and rotatably supporting the screw, wherein the housing may include a piston guide portion for slidably and rotatably supporting the piston, and the guide may be disposed at a portion of the piston guide portion facing the piston.

The friction element latch device may further include a power transmitting member provided to engage or disengage the friction element by receiving power from the piston.

The power transmitting member may include a friction element elastic member having elasticity.

The friction element latch device may further include a ball provided to convert a rotational force of the screw to a moving force of the first piston.

In accordance with another aspect of the present disclosure, a friction element latch device includes: a screw arranged to be rotatable by receiving power from a driving source; a piston arranged to be movable by rotation of the screw; a guide arranged to selectively restrict movement of the piston; a guide pin protruding in a radial direction from an outer circumferential surface of the piston to be movable together with the piston and guided by the guide; and a friction element arranged to be engaged as the piston moves, wherein the guide includes a restriction device arranged to restrict movement of the guide pin in one direction in order to maintain a state in which the friction element is engaged.

The guide may further include a guide device for guiding the movement of the guide pin to move the piston in a direction in which the friction element is disengaged.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
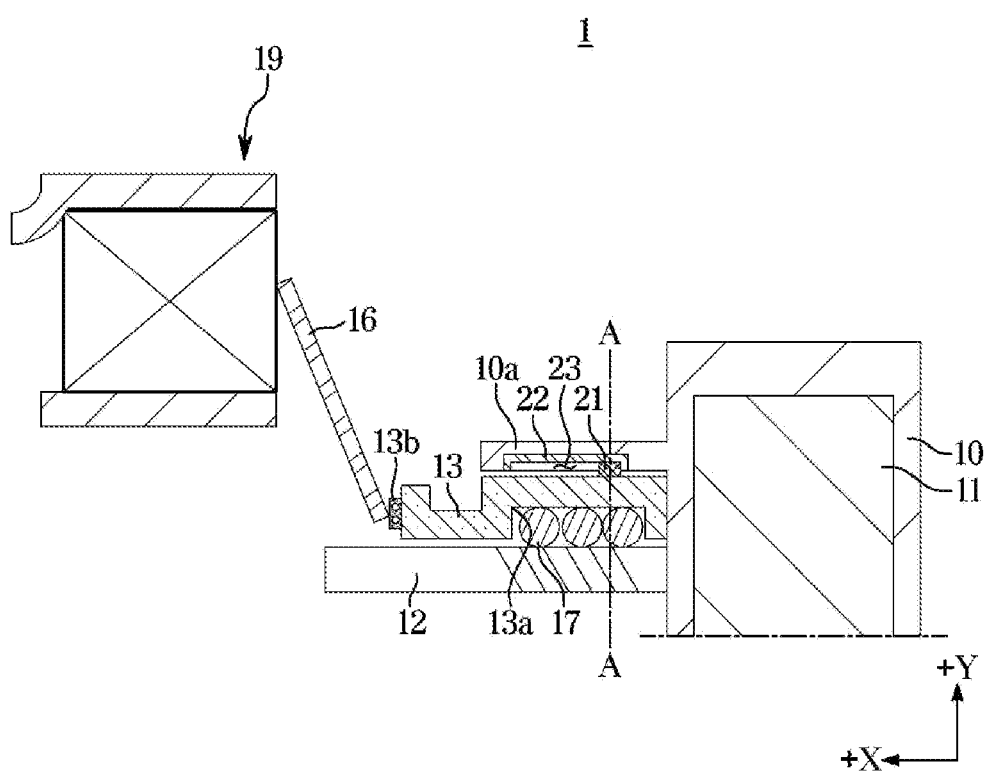
FIG. 1 is a schematic view illustrating a state in which a friction element latch device according to an exemplary embodiment of the present disclosure is released.

The exemplary embodiments described herein and the configurations shown in the drawings are only examples of exemplary embodiments of the present disclosure, and various modifications may be made at the time of filing of the present disclosure to replace the embodiments and drawings of the present specification.

Like reference numbers or designations in the drawings of the present application represent parts or components that perform substantially the same functions.

The terms used herein are for the purpose of describing the embodiments and are not intended to restrict and/or to limit the present disclosure. For example, the singular expressions herein may include plural expressions, unless the context clearly dictates otherwise. The terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms "first," "second," etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. The term "and/or" includes any combination of a plurality of related items or any one of a plurality of related items.

Hereinafter embodiments according to the present disclosure will be described in detail with reference to the accompanying drawings.

Figure 2:
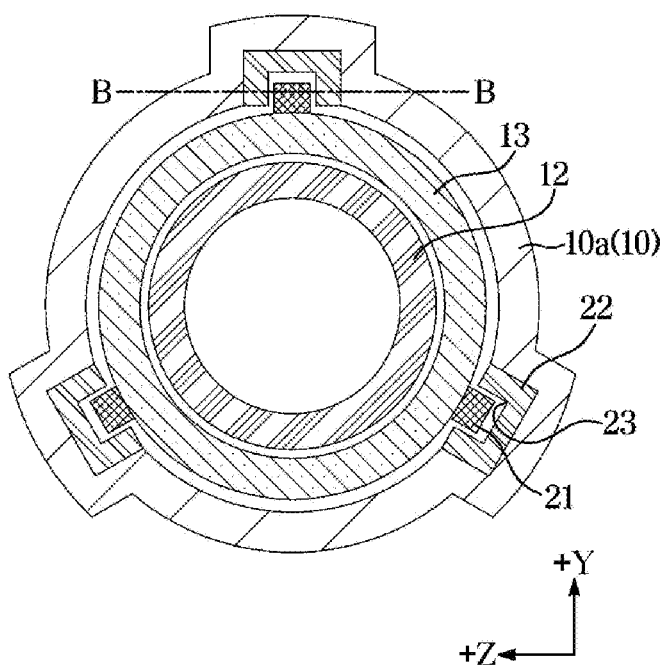
FIG. 2 is a cross-sectional view taken along line A-A' shown in FIG. 1.
Figure 3:
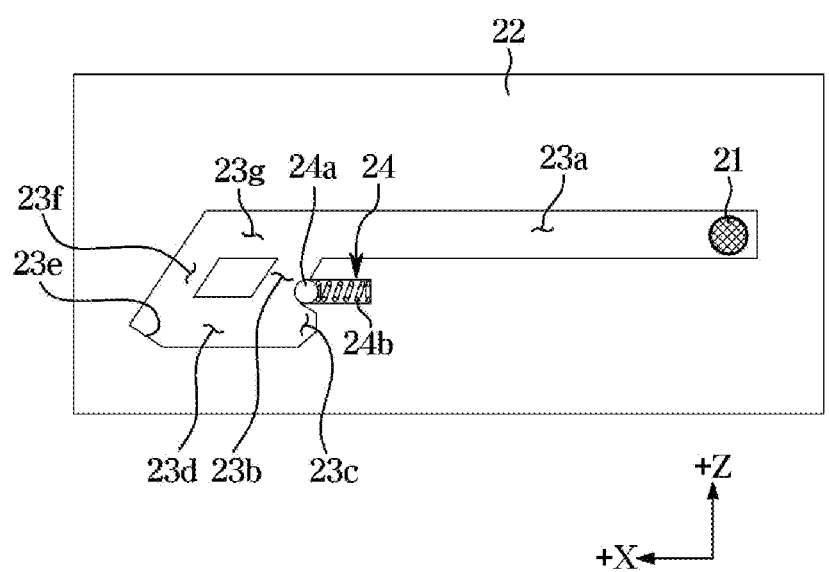
FIG. 3 is a cross-sectional view taken along line B-B' shown in FIG. 2.

FIG. 1 is a schematic view illustrating a state in which a friction element latch device according to an exemplary embodiment of the present disclosure is released, FIG. 2 is a cross-sectional view taken along line A-A' shown in FIG. 1, and FIG. 3 is a cross-sectional view taken along line B-B' shown in FIG. 2.

Referring to FIGS. 1 to 3, a friction element latch device 1 may be configured to selectively engage friction element 19. Specifically, the friction element latch device 1 may include a housing 10, a driving source 11, a screw 12, a piston 13, a power transmitting member 16, and the friction element 19.

The housing 10 may accommodate the driving source 11 therein. The housing 10 may slidably support the piston 13. The housing 10 may include a piston guide portion 10a for slidably supporting the piston 13. The piston guide portion 10a may extend along an x-axis direction. The housing 10 may be provided with configurations for engaging or disengaging the friction element 19.

The driving source 11 may be accommodated inside the housing 10. The driving source 11 may be configured to generate a driving force for rotating the screw 12. The driving source 11 may be configured to generate an engaging force for engaging the friction element 19. The driving source 11 may be configured to include a motor. The driving source 11 may be configured to include a motor capable of forward rotation and reverse rotation.

The screw 12 may be configured to rotate by receiving power from the driving source 11. The screw 12 may include threads formed along an outer circumferential surface. The threads may be formed in a size corresponding to an at least one ball 17. The screw 12 may rotate about a rotation shaft extending along the x-axis direction. The rotation shaft of the screw 12 may be provided in the same direction as the direction in which the friction element 19 is engaged and disengaged.

The piston 13 may be configured to be movable as the screw 12 rotates. The piston 13 may move by receiving a rotational force of the screw 12 when the screw 12 rotates. The piston 13 may move along the x-axis direction. The piston 13 may move along a direction parallel to the rotation shaft of the screw 12. The piston 13 may move in a direction approaching the friction element 19 and in a direction away from the friction element 19. The piston 13 may be slidably supported by the housing 10.

The piston 13 may include a guide pin 21. The guide pin 21 may protrude from an outer circumferential surface of the piston 13. The guide pin 21 may extend in a direction perpendicular to the x-axis. The guide pin 21 may extend radially outwardly of the piston 13. The guide pin 21 may be inserted into a guide 22 provided on the housing 10. The movement of the guide pin 21 may be guided by the guide 22.

Referring to FIG. 2, a plurality of the guide pins 21 may be provided. The plurality of guide pins 21 may be disposed to be spaced apart from each other along the outer circumferential surface of the piston 13 by a predetermined distance.

The piston 13 may include a pressing portion 13b in contact with the power transmitting member 16. When the piston 13 is moved by the screw 12, the pressing portion 13b may press the power transmitting member 16 toward the friction element 19. The pressing portion 13b may be disposed at the other end opposite to one end of the piston 13 facing the driving source 11.

The at least one ball 17 may be provided between the screw 12 and the piston 13. The ball 17 may be provided to perform rolling motion on an outer circumferential surface of the screw 12. The ball 17 may be provided to perform the rolling motion with respect to the piston 13. The ball 17 may be disposed in a ball accommodating portion 13a formed on the piston 13.

The ball 17 may convert the rotational force of the screw 12 into a moving force of the piston 13. That is, as the screw 12 rotates, the ball 17 rolls and moves in the x-axis direction along the outer circumferential surface of the screw 12, and as the ball 17 rolls and moves, the piston 13 rolls and moves in the x-axis direction.

The housing 10 may be provided with the guide 22 for guiding the movement of the guide pin 21. The guide 22 may be disposed on the piston guide portion 10a of the housing 10. The guide 22 may be disposed at a portion of the piston guide portion 10a facing the piston 13. The guide 22 may be integrally formed with the housing 10 or may be provided separately from the housing 10 to be mounted on the housing 10.

Referring to FIG. 2, a plurality of the guides 22 may be provided to correspond to the guide pins 21. The plurality of guides 22 may be disposed to be spaced apart from each other along an inner circumferential surface of the piston guide portion 10a of the housing 10 by a predetermined distance. The plurality of guides 22 may be disposed at positions corresponding to the plurality of guide pins 21.

The guide 22 may include a guide groove 23 into which the guide pin 21 is inserted. The guide groove 23 may be formed such that one surface of the guide 22 facing the piston 13 is recessed along a radial direction of the piston guide portion 10a. The guide pin 21 may slidably move inside the guide groove 23. The guide groove 23 may be formed to correspond to the size and/or shape of the guide pin 21.

Specifically, the guide 22 located at 12 o'clock among the plurality of guides 22 shown in FIG. 2 will be described along the x-axis, y-axis, and z-axis directions, and a state in which a guide having the same structure as the guide 22 described below is rotated about the rotation shaft of the screw 12 may be applied to the other guides 22.

The guide groove 23 of the guide 22 may be formed such that the piston 13 may be located in a position capable of engaging or disengaging the friction element 19 as the piston 13 is moved by the driving source 11. Specifically, the guide groove 23 may include a first portion 23a, a second portion 23b, a third portion 23c, a fourth portion 23d, a fifth portion 23e, a sixth portion 23f, and a seventh portion 23g.

The first portion 23a may extend along the x-axis direction. When the guide pin 21 slidingly moves in the first portion 23a, the piston 13 may move along a +x-axis direction. The first portion 23a may be formed such that one end thereof adjacent to the friction element 19 joins the second portion 23b and the seventh portion 23g.

The second portion 23b may extend toward a direction between the +x-axis direction and a −z-axis direction from one end of the first portion 23a adjacent to the friction element 19. When the guide pin 21 slidingly moves in the second portion 23b, the piston 13 may move along the +x-axis direction while rotating clockwise with reference to FIG. 2.

The third portion 23c may be formed at the other end opposite to one end of the second portion 23b that joins the first portion 23a. When the guide pin 21 is located in the third portion 23c, the piston 13 may maintain a state in which the friction element 19 is engaged. When the guide pin 21 is located in the third portion 23c, the piston 13 may move in the +x-axis direction to maintain a state of pressing the power transmitting member 16. The third portion 23c may be recessed in a −x-axis direction at the other end of the second portion 23b.

The fourth portion 23d may extend along the +x-axis from the third portion 23c. When the guide pin 21 slidingly moves in the fourth portion 23d, the piston 13 may move along the +x-axis direction The fifth portion 23e may include an inclined surface extending toward a direction between the +x-axis direction and a +z-axis direction from one end of the fourth portion 23d adjacent to the friction element 19. When the guide pin 21 slidingly moves in the fifth portion 23e, the piston 13 may move along the +x-axis direction while rotating counterclockwise with reference to FIG. 2. The fifth portion 23e may guide the guide pin 21 to move to the sixth portion 23f.

The sixth portion 23f may extend toward a direction between a −x-axis direction and a +z-axis direction from the fifth portion 23e. When the guide pin 21 slidingly moves in the sixth portion 23f, the piston 13 may move along the −x-axis direction while rotating counterclockwise with reference to FIG. 2.

The seventh portion 23g may extend between the sixth portion 23f and the first portion 23a. The seventh portion 23g may extend along the x-axis direction. When the guide pin 21 slidingly moves in the seventh portion 23g, the piston 13 may move along the −x-axis direction. The seventh portion 23g may be formed such that one end of the seventh portion 23g far from the friction element 19 joins the first portion 23a and the second portion 23b.

The guide 22 may be provided with a restriction device 24. The restriction device 24 may be disposed between the second portion 23b and the third portion 23c of the guide groove 23. The restriction device 24 may be configured to restrict the movement of the guide pin 21 to the second portion 23b when the guide pin 21 is located in the third portion 23c.

The restriction device 24 may include a restricting member 24a and a restricting elastic member 24b for applying an elastic force to the restricting member 24a so that the restricting member 24a protrudes inside the second portion 23b. One end of the restricting elastic member 24b may be fixed to the guide 22 and the other end may be fixed to the restricting member 24a. The restricting member 24a may be elastically biased to protrude inside the second portion 23b.

The restricting member 24a may move so as not to interfere with the movement of the guide pin 21 as the restricting elastic member 24b is compressed when the guide pin 21 moves from the second portion 23b to the third portion 23c, and may support the guide pin 21 so that the guide pin 21 does not move to the second portion 23b when the guide pin 21 is located in the third portion 23c. Therefore, when the guide pin 21 moves from the second portion 23b to the third portion 23c, the driving source 11 provides additional power.

The power transmitting member 16 may be configured to engage or disengage the friction element 19 by receiving power from the piston 13. The power transmitting member 16 may convert the moving force of the piston 13 into an engaging force for engaging the friction element 19. The power transmitting member 16 may be configured to include a friction element elastic member having elasticity. The friction element elastic member may be a spring.

The friction element 19 may be configured to include a plurality of plates (not shown) and/or a plurality of discs (not shown). A state in which the plurality of plates and/or the plurality of discs are in pressure contact with each other may be considered to be in an engaged state. The friction element 19 may be configured to be engaged or disengaged as the piston 13 moves. The friction element 19 may be provided as a clutch device of a transmission or a brake device. That is, the friction element latch device 1 according to an embodiment of the present disclosure may be applied to the clutch device of the transmission or the brake device.

Figure 4:
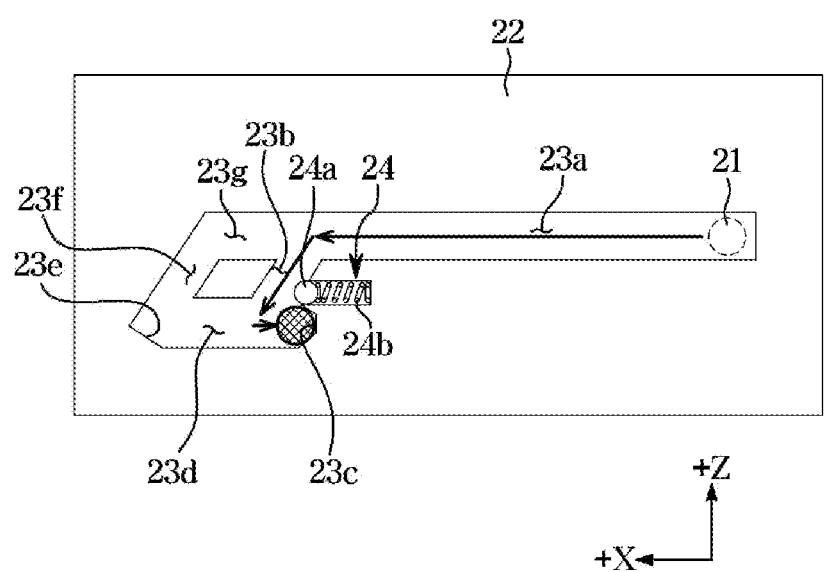
FIG. 4 is a cross-sectional view similar to that shown in FIG. 3, illustrating a state in which the friction element latch device according to an exemplary embodiment of the present disclosure is engaged.
Figure 5:
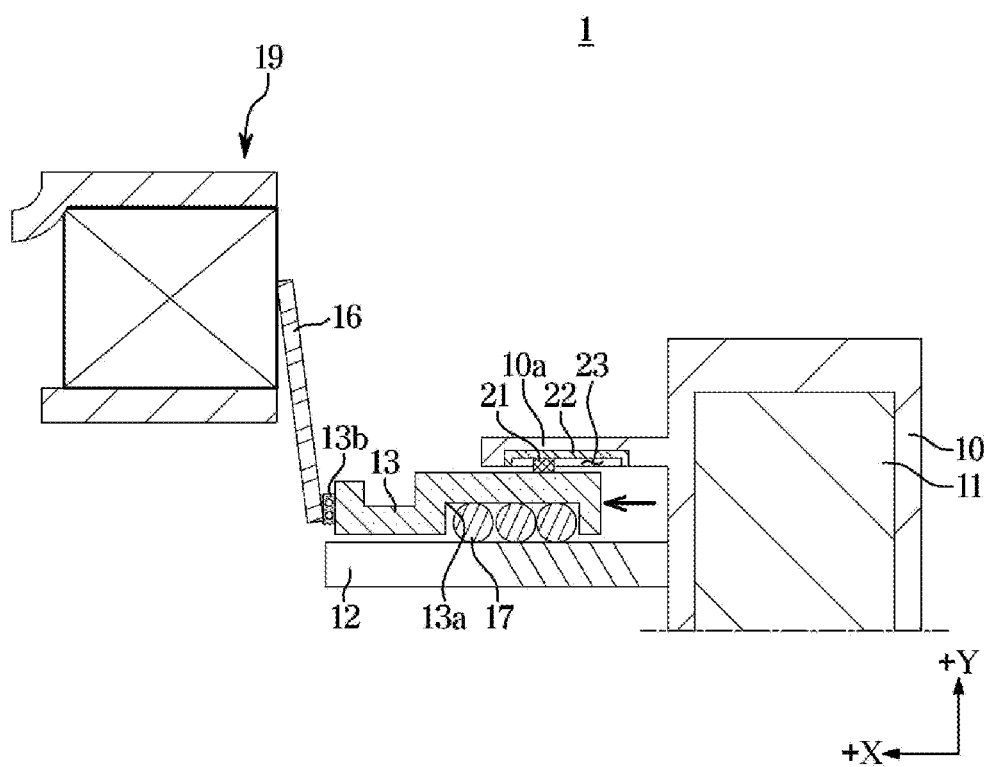
FIG. 5 is a schematic view illustrating the state in which the friction element latch device according to an exemplary embodiment of the present disclosure is engaged.
Figure 6:
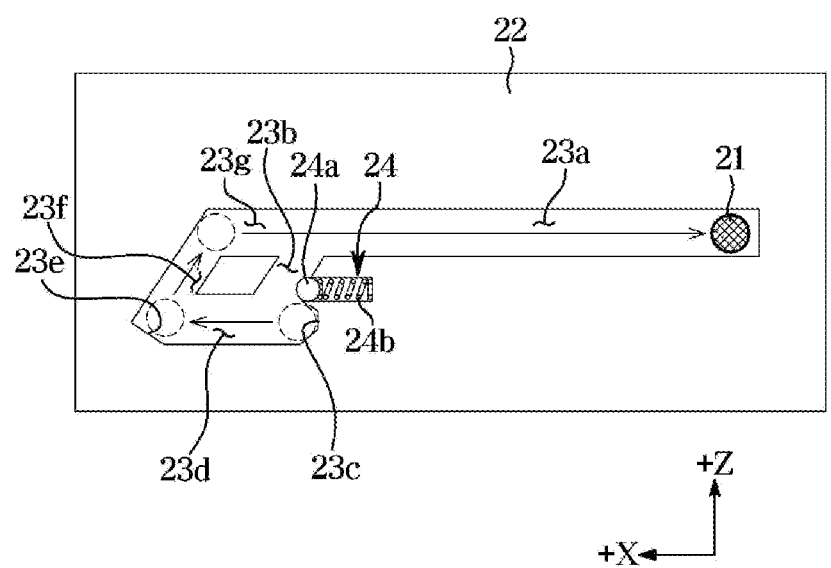
FIG. 6 is a view illustrating a process of releasing the friction element latch device in the engaged state according to an exemplary embodiment of the present disclosure.

FIG. 4 is a cross-sectional view similar to that shown in FIG. 3, illustrating a state in which the friction element latch device according to an exemplary embodiment of the present disclosure is engaged. FIG. 5 is a schematic view illustrating the state in which the friction element latch device according to an exemplary embodiment of the present disclosure is engaged. FIG. 6 is a view illustrating a process of releasing the friction element latch device in the engaged state according to an exemplary embodiment of the present disclosure.

The operation of the friction element latch device 1 according to the above configuration will be described below.

Referring to FIGS. 1 and 3, when the friction element 19 is in the disengaged state, the position of the piston 13 may be referred to as a first position. At this time, the guide pin 21 may be located at an end of the first portion 23a of the guide groove 23 in the −x axis direction.

Referring to FIGS. 4 and 5, when the friction element 19 is to be engaged, the driving source 11 generates power, so that the screw 12 is rotated. As the screw 12 rotates, the ball 17 rolls and moves along the outer circumferential surface of the screw 12, thereby causing the piston 13 to move toward the friction element 19 as well.

As a result, the guide pin 21 may move to the third portion 23c through the first portion 23a and the second portion 23b of the guide groove 23 in sequence. Specifically, the guide pin 21 may move in the +x-axis direction along the first portion 23a of the guide groove 23 as the piston 13 moves in the +x-axis direction. The guide pin 21 may move to the +x-axis direction end of the first portion 23a and then to the second portion 23b.

The screw 12 rotates clockwise with reference to FIG. 2, so that the screw 12 may apply a force to the piston 13 in the direction between the +x axis direction and the −z axis direction. Therefore, when located at the +x-axis direction end of the first portion 23a, the guide pin 21 does not move to the seventh portion 23g but moves to the second portion 23b. As the piston 13 moves in the direction between the +x axis direction and the −z axis direction, the guide pin 21 may move in the direction between the +x axis direction and the −z axis direction along the second portion 23b of the guide groove 23.

The guide pin 21 that has passed through the second portion 23b may be positioned and fixed in the third portion 23c. When the guide pin 21 is positioned in the third portion 23c, the piston 13 may press the power transmitting member 16 to bring the friction element 19 into the engaged state. The third portion 23c may also be referred to as the latch groove 23c from the viewpoint that the third portion 23c fixes the position of the guide pin 21 so that the piston 13 may keep the friction element 19 in the engaged state. The guide pin 21 positioned in the third portion 23c may be supported by the restriction device 24 to prevent the guide pin 21 from moving to the second portion 23b.

The position of the guide pin 21 is fixed by the latch groove 23c and thus the position of the piston 13 is also fixed, so that the driving source 11 may not provide power for rotating the screw 12. That is, the driving source 11 does not need to maintain the torque. Because the drive source 11 does not need to supply power due to the latch groove 23c and the guide pin 21, the energy consumption may be reduced, and therefore the fuel efficiency may be improved.

Alternatively, when the friction element 19 is in the engaged state, that is, when the guide pin 21 is positioned in the latch groove 23c, the driving source 11 may be configured to generate a minimum power for fixing the position of the piston 13 to rotate the screw 12, and to apply a predetermined magnitude of force to the piston 13. That is, the driving source 11 may fix the position of the piston 13 with a torque smaller than a torque generated for fixing the position of the piston 13 by only the driving source 11.

Referring to FIG. 6, thereafter, when the friction element 19 is to be disengaged, the driving source 11 generates power to rotate the screw 12, thereby causing the piston 13 to move in the +x axis direction. Accordingly, the guide pin 21 moves in the +x-axis direction along the fourth portion 23d and moves to the fifth portion 23e.

The guide pin 21 that has moved to the fifth portion 23e is guided in the +z-axis direction by the fifth portion 23e and moves to the sixth portion 23f. The fifth portion 23e may also be referred to as the guide surface 23e from the viewpoint that the fifth portion 23e guides the movement of the guide pin 21 so that the guide pin 21 may move to the sixth portion 23f.

Then, when the driving source 11 stops generating power, the piston 13 rotates and moves in a direction away from the friction element 19. At this time, the guide pin 21 moves to the seventh portion 23g in the direction between the −x axis direction and the +z axis direction along the sixth portion 23f, and the piston 13 also moves in the same direction as the guide pin 21 while rotating.

The guide pin 21 that has moved to the seventh portion 23g moves to the first portion 23a in the −x axis direction along the seventh portion 23g, and therefore the piston 13 moves along the −x axis direction. The guide pin 21 that has moved to the first portion 23a continues to move in the −x axis direction along the first portion 23a, and therefore, the piston 13 also moves along the −x axis direction so that the friction element 19 is released from the engaged state.

According to this configuration, because the friction element latch device 1 according to the embodiment of the present disclosure does not consume extra energy for maintaining the engagement state of the friction element 19, the energy consumption may be reduced, and the transmission efficiency of the transmission may be improved, thereby improving the fuel efficiency. In addition, because the engagement and disengagement of the friction element 19 may be controlled by one of the driving source, a relatively simple configuration may be realized and the responsiveness to disengagement of the friction element 19 may be improved as compared with a hydraulic system.

Figure 7:
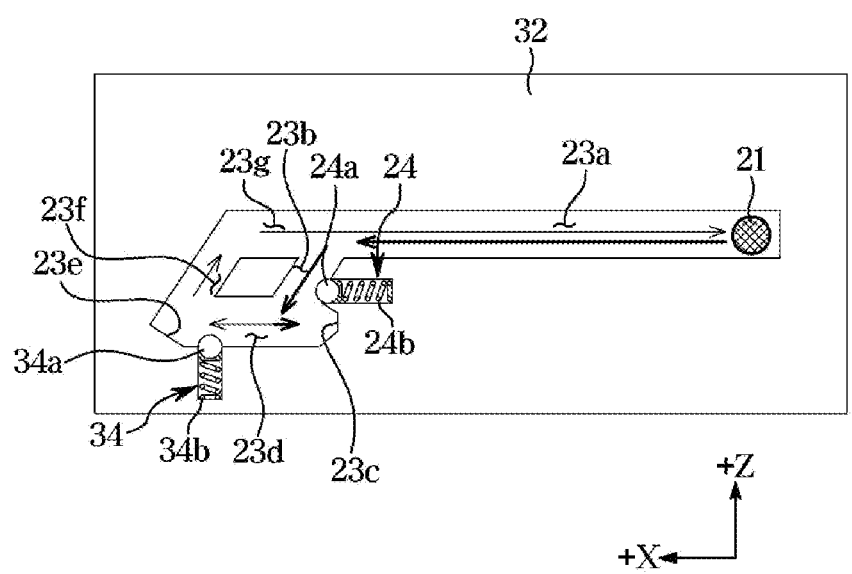
FIG. 7 is a view illustrating a guide of a friction element latch device according to another exemplary embodiment of the present disclosure.

FIG. 7 is a view illustrating a guide of a friction element latch device according to another exemplary embodiment of the present disclosure.

The friction element latch device 1 having a guide 32 according to another exemplary embodiment of the present disclosure will be described below with reference to FIG. 7. The same components as those shown in FIGS. 1 to 6 are denoted by the same reference numerals, and a detailed description thereof may be omitted.

Referring to FIG. 7, the guide 32 according to another exemplary embodiment of the present disclosure may be further provided with a guide device 34. The guide device 34 may be configured to protrude inward of the fourth portion 23d.

The guide device 34 may include a support member 34a and a guide elastic member 34b for applying an elastic force to the support member 34a so that the support member 34a protrudes inside the fourth portion 23d. One end of the guide elastic member 34b may be fixed to the guide 32 and the other end may be fixed to the support member 34a. The support member 34a may be elastically biased to protrude inside the fourth portion 23d.

The guide device 34 may support the movement of the guide pin 21 when the guide pin 21 moves to the fifth portion 23e and the sixth portion 23f through the fourth portion 23d of the guide groove 23. The guide device 34 may be configured to apply a force in the +z-axis direction to the guide pin 21 slidingly moving along the fourth portion 23d. The guide pin 21 may move to the sixth portion 23f through the fourth portion 23d and the fifth portion 23e in sequence by the guide device 34. The guide device 34 may allow the guide pin 21 to smoothly move from the fourth portion 23d to the sixth portion 23e together with the fifth portion 23e.

As is apparent from the above, according to a friction element latch device of the present disclosure, because the energy for maintaining the engagement of friction element is not consumed, the energy consumption can be reduced.

Further, according to a friction element latch device of the present disclosure, because the engagement and disengagement of the friction element can be controlled by a single drive source, a relatively simple configuration can be realized.

Although the technical idea of the disclosure has been described above with reference to specific embodiments, the scope of rights of the disclosure is not limited to these embodiments. It will be understood by those skilled in the art that various changes in form and details may be made therein without departing from the spirit and scope of the disclosure as defined by the appended claims and their equivalents.

What is claimed is:

1. A friction element latch device comprising:
   a screw arranged to be rotatable by receiving power from a driving source;
   a piston arranged to be movable by rotation of the screw;
   a guide arranged to selectively restrict movement of the piston;
   a guide pin protruding in a radial direction from an outer circumferential surface of the piston to be movable together with the piston and guided by the guide; and
   a friction element arranged to be engaged as the piston moves,
   wherein the guide includes a guide groove into which the guide pin is slidably inserted, and
   wherein the guide groove includes a latch groove restricting the movement of the guide pin in order to maintain a state in which the friction element is engaged.

2. The friction element latch device according to claim 1, wherein the guide further includes a restriction device protruding toward an inside of the guide groove to restrict the movement of the guide pin in order to maintain the state in which the friction element is engaged.

3. The friction element latch device according to claim 2, wherein the restriction device includes a restricting member and a restricting elastic member arranged to elastically bias the restricting member toward the inside of the guide groove.

4. The friction element latch device according to claim 1, wherein the guide groove includes a guide surface for guiding the movement of the guide pin to move the piston in a direction in which the friction element is disengaged.

5. The friction element latch device according to claim 1, wherein the guide further includes a guide device for guiding the movement of the guide pin to move the piston in a direction in which the friction element is disengaged.

6. The friction element latch device according to claim 5, wherein the guide device includes a support member and a guide elastic member arranged to elastically bias the support member toward the inside of the guide groove.

7. The friction element latch device according to claim 1, wherein a plurality of the guide pins are arranged along a circumferential direction of the piston, and
   wherein a plurality of the guides correspond to the plurality of guide pins.

8. The friction element latch device according to claim 1, further comprising a housing for accommodating the driving source and rotatably supporting the screw,
   wherein the housing includes a piston guide portion for slidably and rotatably supporting the piston, and
   wherein the guide is disposed at a portion of the piston guide portion facing the piston.

9. The friction element latch device according to claim 1, further comprising a power transmitting member arranged to engage or disengage the friction element by receiving power from the piston.

10. The friction element latch device according to claim 9, wherein the power transmitting member includes a friction element elastic member having elasticity.

11. The friction element latch device according to claim 1, further comprising a ball converting a rotational force of the screw to a moving force of the first piston.

12. A friction element latch device comprising:
    a screw arranged to be rotatable by receiving power from a driving source;
    a piston arranged to be movable by rotation of the screw;
    a guide arranged to selectively restrict movement of the piston;
    a guide pin protruding in a radial direction from an outer circumferential surface of the piston to be movable together with the piston and guided by the guide; and
    a friction element arranged to be engaged as the piston moves,
    wherein the guide includes a restriction device arranged to restrict movement of the guide pin in one direction in order to maintain a state in which the friction element is engaged.

13. The friction element latch device according to claim 12, wherein the guide further includes a guide device for guiding the movement of the guide pin to move the piston in a direction in which the friction element is disengaged.

* * * * *